United States Patent [19]
Kojima et al.

[11] Patent Number: 4,839,787
[45] Date of Patent: Jun. 13, 1989

[54] INTEGRATED HIGH VOLTAGE GENERATING SYSTEM

[75] Inventors: Makoto Kojima, Suita; Hirozumi Misaki, Takatsuki; Yasuyuki Okada, Tkakatsuki, all of Japan

[73] Assignee: Matsushita Electric Industrial Co., Ltd., Osaka, Japan

[21] Appl. No.: 197,448

[22] Filed: May 20, 1988

[30] Foreign Application Priority Data

May 20, 1987 [JP] Japan ................... 62-122931

[51] Int. Cl.⁴ ................. H02J 11/00; H02M 3/18
[52] U.S. Cl. ...................... 363/60; 307/110
[58] Field of Search ............... 363/59, 60, 61; 320/1; 307/110

[56] References Cited

U.S. PATENT DOCUMENTS

| | | | |
|---|---|---|---|
| 3,824,447 | 7/1974 | Kuwabara | 363/60 |
| 4,186,436 | 1/1980 | Ishiwatari | 363/60 |
| 4,636,930 | 1/1987 | Bingham et al. | 363/60 |
| 4,734,599 | 3/1988 | Bohac, Jr. | 307/110 |

FOREIGN PATENT DOCUMENTS 2058502A 8/1980 United Kingdom .

*Primary Examiner*—Peter S. Wong
*Attorney, Agent, or Firm*—Wenderoth, Lind & Ponack

[57] ABSTRACT

This invention relates to an integrated high voltage generating system provided with a charge pump for raising the input power supply voltage sequentially while transferring the electric charges of the capacitors on a stage by stage basis, by serially connecting unit circuits composed of diode elements and capacitors, and supplying clock signals of mutually opposite phases to adjacent capacitors. Source and drain electrodes of a MOS transistor are connected between the first power supply output terminal and a second power supply output terminal, and the gate electrode of this MOS transistor is connected to the input end of any one of the unit circuits of the charge pump, wherein the voltage of the first power supply output terminal is stepped down depending on the voltage applied to the gate electrode of the MOS transistor, and is delivered to the second power supply output terminal. In this way, since the voltage is not stepped down using a dividing circuit, a potential between input power supply voltage and the first input power supply voltage can be obtained from the second power supply output terminal, without consuming unnecessary current and without causing the chip area to be increased.

9 Claims, 4 Drawing Sheets

INTEGRATED HIGH VOLTAGE GENERATING SYSTEM

BACKGROUND OF THE INVENTION

This invention relates to an integrated high voltage generating system, and more particularly to an integrated high voltage generating system having a charge pump.

Various products have recently been developed which are portable and compact, and, as a result, they tend to have a lower supply voltage obtained from a single power source. For example, the power voltage of portable radio or portable tape recorder is about 1.5 to 3.0 V. When a high power voltage is required for a product, a high voltage generating system is incorporated in the product or a semiconductor device used in the product. When an integrated high voltage generating sytem is incorported in a semiconductor device, the high voltage is generated by using a charge pump. Furthermore, if a high voltage power source having different potentials is needed, a high voltage is first generated by the charge pump, and this high voltage is divided and stepped down. The output is controlled using this divided voltage, thereby creating another high voltage source different from the original high voltage source. However, since the current supply capacity of the charge pump in the device is smaller in relation to its area, the electric power consumed in this dividing circuit cannot be ignored.

A conventional integrated high voltage generating system using a charge pump is described below.

FIG. 7 shows a conventional example of an integrated high voltage generating system using a charge pump for delivering two different power voltages. It comprises a charge pump having four unit circuits connected in series composed of diode-connected N-channel MOS transistors 1 to 5 and capacitors 6 to 9, a dividing circuit composed of two MOS transistors 17, 18, and a step-down control part composed of a MOS transistor 11 gated by the divided voltage of the dividing circuit.

The operation of the conventional integrated high voltage generating system is explained by referring to FIG. 7.

The electric charge coming in through the MOS transistor 1 from power source $V_{cc}$ connected to the power source input terminal is sequentially transferred among four stages of unit circuit controlled by clock signals CLK, $\overline{\text{CLK}}$ of normal and reverse phases with an amplitude of $V_{cc}$, and is sequentially boosted in this process. The boosted power supply voltage is delivered to a first power supply output terminal OUT 1. Part of this power supply voltage is delivered to a second power supply output terminal OUT 2 as another power supply voltage, by way of a step-down MOS transistor 11 which is gated by the divided output of the dividing circuit composed of two MOS transistors 17, 18. However, when a dividing circuit is used within the integrated high voltage generating system, the stability and response of this circuit and the current consumption are in conflict with each other, and accordingly the current consumption cannot be significantly decreased. The reason is as follows. Usually, at the first power supply output terminal OUT 1, a current flows of about several microamperes. On the other hand, when the MOS transistors 17, 18 are fabricated according to the design rule of about 3 microns, the gate width (W) and gate length (L) of the gate electrode are usually about 60 microns and 3.0 microns respectively and their ratio W/L is about 20. At this time, the circuit IL flowing in the MOS transistors 17, 18 is about 5 mA. That is, when such MOS transistors 17, 18 are used, the majority of the current of several milliamperes delivered from the charge pump is consumed in the dividing circuit, and the function as the integrated high voltage generating system is sacrificed. Hence, as one of the methods of decreasing the current consumption in the dividing circuit to, for example about 5 μA, it may be considered to design the gate width (W) at about 3 microns and the gate length (L) about 1500 microns, that is, the W/L of about 0.002. In turn, hoever, when the gate of MOS transistors 17, 18 is fabricated in such a size, since the gate width (W) itself is only about 3 microns, if its dimension varies about ±0.3 micron, the effect of fluctuation is significant, and the stability of the device is impaired. Or when the gate is reduced to such a size, the stray capacitance of the gate increases. As a result, the response of the circuit is worsened. Thus, in the conventional integrated high voltage generating system using a dividing circuit, it was extremely difficult to lower the current consumption without spoiling the stability and response of the circuit.

Additionally, as another method of decreasing the current consumption, it may be considered to raise the dividing resistance. For example, when dividing 20 V into 15 V, in a 3-micron process, by using a MOS transistor of about 3 mm², the current consumption becomes about 100 μA. To reduce this current consumption, additional MOS transistors as the dividing resistances should be inserted between the power supply terminals of the dividing circuit (more than a dozen in the above example). Thus, the value of the current flowing in the dividing circuit may be reduced to sevaral microamperes, and the current consumption can be decreased. This method however, becomes sensitive to fluctuations of the threshold voltages of the MOS transistors. Accordingly the circuit stability is poor.

On the other hand, the charge pump power supply is extremely small in the supply electric power per umit area, as compared with the power supplied by merely dividing the external power source. Therefore, if the capacity of the charge pump is increased in order to compensate for the slight power consumption in the dividing circuit, the area occupied by the charge pump within the semiconductor device becomes extremely large, and the chip size itself becomes larger.

It is hence a first object of this invention to present an integrated high voltage generating system capable of obtaining a potential between the input power supply voltage and the output power supply voltage without consuming unnecessary current.

It is a second object of this invention to present an integrated high voltage generating system capable of obtaining a potential between the input power supply potential and the output power supply potential without causing the chip area to be increased.

This invention may be briefly summarized as an integrated high voltage generating system including a charge pump having a plurality of unit circuits composed of diodes or diode-connected MOS transistors and capacitors of which one end is connected to the input side of the diodes or the MOS transistors and the other end to the clock signal source, connected in series so that the diode polarities may be in a same direction and clock phases applied to adjacent capacitors may be mutually reverse, wherein an intermediate potential is taken out from the intermediate node between the power supply input terminal of the charge pump and the first power supply output terminal, and this intermediate potential is applied to the gate of the MOS transistor connected between the first power supply output terminal and the second power supply output terminal.

In this constitution, without consuming the unnecessary current as experienced in the dividing circuit, and without causing the chip area to be increased, a potential between the input power supply potential and the first power supply output potential may be obtained from the second power supply output terminal.

Other features and objects of the present invention will be apparent from the following description taken in connection with the accompanying drawings.

DETAILED DESCRIPTION OF THE INVENTION

Figure 1:
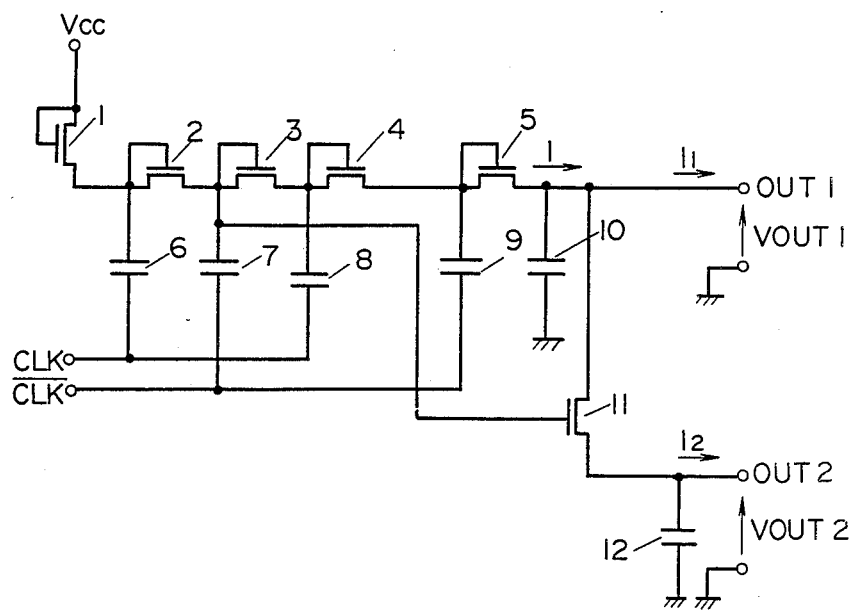
FIG. 1 is a circuit diagram of one embodiment of an integrated high voltage generating system of this invention.

Referring now to the drawings, this invention is described relating to some of the embodiments in detail below.

FIG. 1 is a circuit diagram showing one of the embodiments of this invention. In this diagram, the charge pump constructed by the series connection of four stages of a unit circuit composed of diode-connected N-channel MOS transistor 1 to 5 and capacitors 6 to 9 is same as in the prior art. However, in this charge pump an intermediate potential is taken out from the intermediate node (the second stage in the case of the embodiment in FIG. 1) between the power supply input terminal and power supply output terminal. This intermediate potential gates MOS transistor 11 which couples a first power supply output terminal OUT 1 and a second power supply output terminal OUT 2. The first power supply voltage $V_{OUT}1$ is supplied into a voltage detector circuit (not shown), while the second power supply voltage $V_{OUT}2$ is supplied into a load (not shown). Capacitors 10, 12 are smoothing capacitors to lessen the repple of the first and second power supply output voltage $V_{OUT}1$, $V_{OUT}2$. At each stage of the charge pump, clock signals CLK, $\overline{CLK}$ of mutually opposite phases are applied to adjacent pumps, and their amplitude is $V_{cc}$, equal to that of the power supply voltage.

In this constitution, the electric charge running in through the MOS transistor 1 by way of the power supply $V_{cc}$ connected to the power supply input terminal is sequentially transferred among four stages of the charge pump being controlled by the clock signals CLK, $\overline{CLK}$ of normal and reverse phases having an amplitude of $V_{cc}$.

Figure 2:
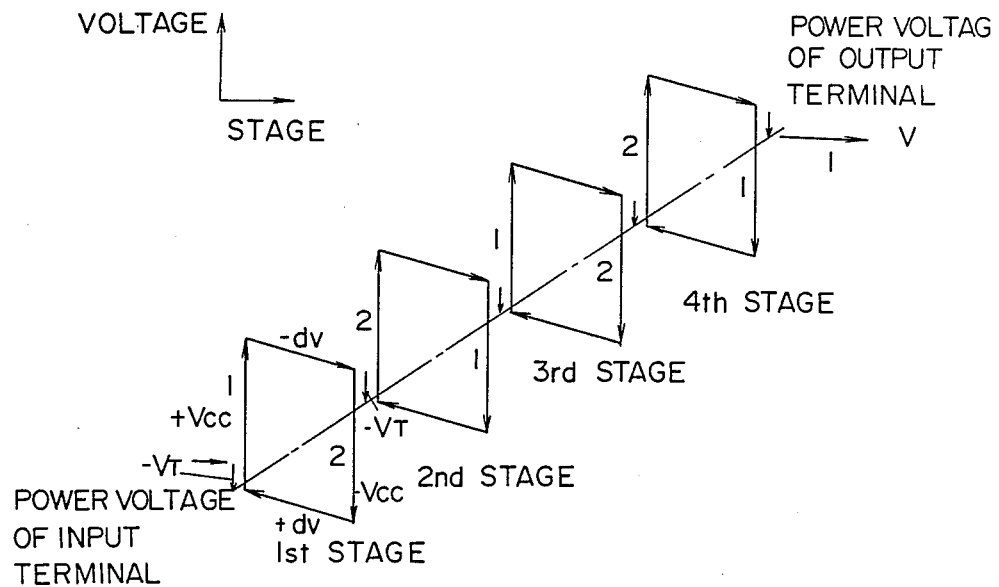
FIG. 2 is a conceptual diagram modeling the voltage changes at each stage of the charge pump in FIG. 1.

The conceptual drawing of the voltage waveform of each node of the charge pump at this time is shown in FIG. 2, is which the output of the first power supply output terminal OUT 1 is $V_{OUT}$, the sum of the currents flowing out is I, and the threshold voltage of the MOS transistors is VT.

The first stage of the charge pump is explained as follows. For the sake of simplicity, the clock signal is suppose to have no transient time and phases of the clock signals CLK and $\overline{CLK}$ are accurately reverse and the capacity of the capacitors 6 to 8 for the charge pump is supposed to be sufficiently larger than the stray capacitance. When the clock signal CLK connected to the capacitor 6 is LOW, the potential of this capacitor 6 is $V_{cc}-VT$. At phase 1, the clock signal CLK rises, and the capacitor potential at the first stage instantly goes up to $V_{cc}-VT+V_{cc}$ to reach the peak voltage. At this moment, the clock signal $\overline{CLK}$ for the capacitor of the next stage (second stage) falls, so that the electric charge stored in the capacitor 6 of the first stage is transferred to the capacitor 7 of the next stage via the MOS transistor 2. As a result, the potential of the capacitor 6 changes by $-dV$. At phase 2, since the clock signal CLK of the capacitor 6 falls, the potential of the capacitor 6 changes by $-V_{cc}$. Accordingly, the potential is decreased to the bottom voltage in a moment and then receiving electric charges from the preceding stage, the potential changes by $+dV$, and the node potential becomes $V_{cc}-VT$. Here, assuming the frequency of the clock signals CLK and $\overline{CLK}$ to be f [Hz] and the capacitance of the capacitor in the charge pump to be C [F], in the stationary state, the electric charge C·dV transferred once from the capacitor 6 to 7 is equal to the sum of the current I/f flowing out per one clock time. Hence, dV=I/fC. Such a cycle occurs in each charge pump.

This operation may be also explained as follows. In the actual charge pump, the ON resistance of the transistors 2 to 5 are inserted in series to the input side of the diode-connected MOS transistors 2 to 5. Accordingly, each stage of the charge pump possesses some time constant due to capacitors 6 to 9 and the ON resistances. Therefore, when clock signals CLK, $\overline{CLK}$ are applied to each stage, the potential of each intermediate node momentarily reaches the peak voltage (or the bottom voltage) when the clock signal rises (or falls), and then changes to a stationary voltage of a high level (or low level) according to the time constant. If rise and fall of clock signals CLK, $\overline{CLK}$ are sufficiently steep, the peak voltage at the n-th stage, the stationary voltage of a high level, the stationary voltage of a low level and the bottom voltage are respectively expressed in equations (1) to (4).

Peak voltage at the n-th stage:

$$VHPn = n \cdot (V_{cc} - V_T) + V_{cc} - (n-1) \cdot I \cdot Rs \qquad (1)$$

High level stationary voltage at the n-th stage:

$$VHn = n \cdot (V_{cc} - V_T) + V_{cc} - n \cdot I \cdot Rs \qquad (2)$$

Low level stationary voltage at the n-th stage:

$$VLn = n \cdot (V_{cc} - V_T) - (n-1) \cdot I \cdot Rs \qquad (3)$$

Bottom voltage at the n-th stage:

$$VLPn = n \cdot (V_{cc} - V_T) - n \cdot I \cdot Rs \qquad (4)$$

where Rs is an equivalent resistance per stage, $Rs = I/fC$. Incidentally, equations (1) to (4) may be also expressed as in equations (5) to (8) respectively, in terms of the first power supply output voltage $V_{OUT}1$ and the power supply voltage $V_{cc}$. In these equations, N denotes the total number of stages of the unit circuit in the charge pump.

$$VHn = n \cdot V_{OUT}1/N + (N-n) \cdot (V_{cc} - V_T)/N + V_T \quad (5)$$

$$VHPn = VHn + I \cdot Rs \quad (6)$$

$$VLn = (n-1) \cdot V_{OUT}1/N + (N-n+1) \cdot (V_{cc} - V_T)/N \quad (7)$$

$$VLPn = VLn - I \cdot Rs \quad (8)$$

From equation (7) it is known that the low level stationary potential of the potential of the intermediate node obtained from the n-th stage is equal to the potential of interior division between the voltage $V_{OUT}1$ of the first power supply voltage OUT 1 and the value lower by $V_T$ than the voltage $V_{cc}$ of the power supply input terminal into $N-n+1$; $n-1$, that is, a divided voltage.

In the embodiment shown in FIG. 1, an intermediate potential is obtained from the intermediate node at the second stage, which corresponds to the case where $n=2$. In this circuit, from the second power supply output terminal OUT 2, a voltage lower than the maximum voltage applied to the gate of the MOS transistor 11 by $V_T$ (threshold voltage of the MOS transistor 11) is taken out as the second power supply output voltage $V_{OUT}$ 2. That is, the second power supply voltage $V_{OUT}$ 2 is $$V_{OUT} = n \cdot V_{OUT}2/N + (N-n) \cdot (V_{cc} - V_T)/N + I \cdot Rs \quad (9)$$

Figure 7:
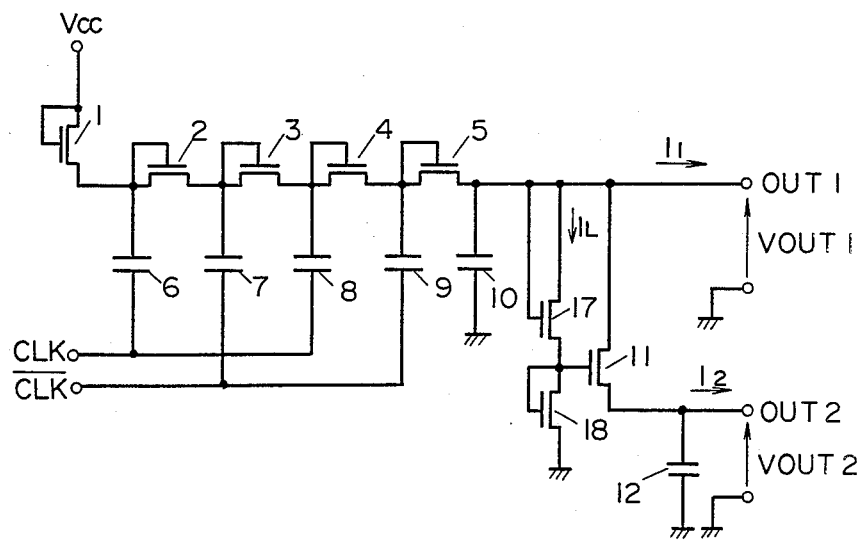
FIG. 7 is a circuit diagram of a conventional integrated high voltage generating system.

As clearly understood from this embodiment, by selecting the intermediate node (that is, in this case, setting n to any one of 1 to 4), the value of the second power supply voltage $V_{OUT}2$ can be changed. Furthermore, in this circuit, since the dividing circuit as used in the conventional example shown in FIG. 7 is not used, a potential between the input power supply voltage and the second power supply output voltage $V_{OUT}2$ may be obtained without consuming any unnecessary current.

Figure 3:
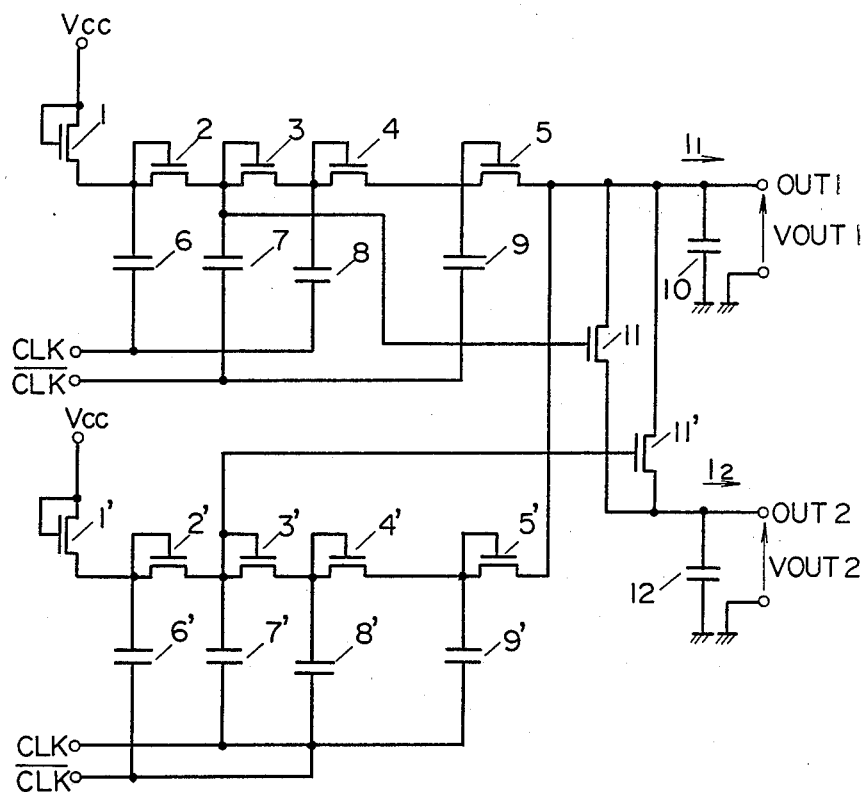
FIG. 3 is a circuit diagram of a second embodiment of this invention.

FIG. 3 shows a second embodiment of this invention, combining two pieces of the embodiments shown in FIG. 1, and the parts indicated by reference numbers 1' to 11' are identical in function with 1 to 11 in FIG. 1, respectively. At the power supply input terminal of each charge pump, power supply $V_{cc}$ is connected, and the power supply output terminals are commonly connected. Furthermore, clock signals CLK, $\overline{\text{CLK}}$ are applied to each stage of two charge pumps so that the phase may be reverse to each other. Accordingly, the output voltages are same as in the first embodiment in FIG. 1, but the phase of operation of each charge pump is reverse to each other, so that the operation is effected in such a manner as to reduce the ripple of the first and second power supply output voltage $V_{OUT}1$, $V_{OUT}2$ of the first and second power supply output terminals OUT 1, OUT 2. That is, in the case using one line of a charge pump as in FIG. 1, pulsating currents similar to when a half-wave rectifying voltage is smoothed are caused, and the ripple content increases. However, when two lines of charge pump are driven alternately in reverse phases as shown in FIG. 3, the pulsating currents become as if full-wave rectifying voltage were being smoothed, so that the ripple content is decreased correspondingly.

Figure 4:
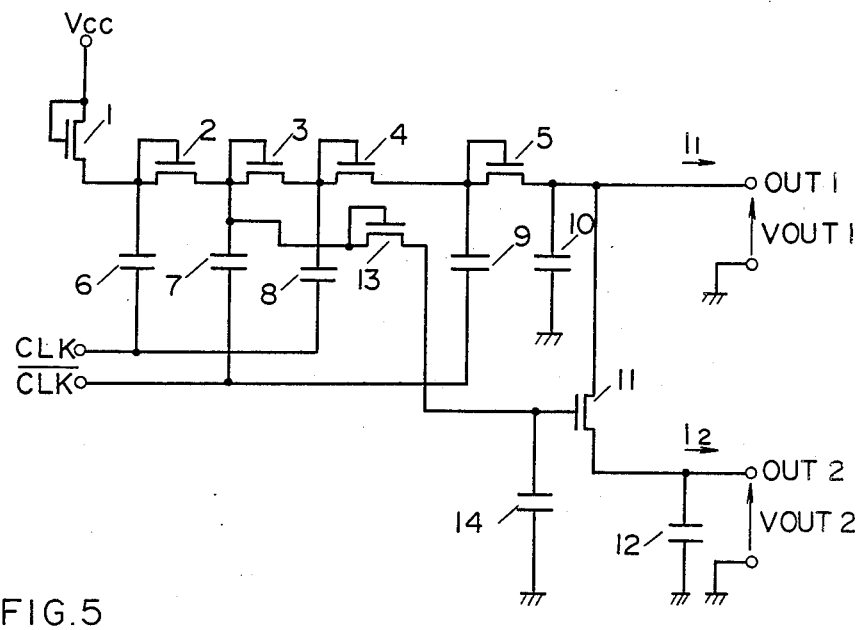
FIG. 4 is a circuit diagram of third embodiment of this invention.

FIG. 4 shows a third embodiment of this invention, in which a diode-connected MOS transistor 13 and a smoothing capacitor 14 are inserted between the intermediate node and the step-down MOS transistor 11 in FIG. 1. By constructing the circuit in this way, the gate voltage of the step-down MOS transistor 11 is stabilized, and the second power supply output voltage $V_{OUT}$ 2 is also stabilized. The reason for this is as follows. As stated above, from the second power supply output terminal OUT 2, voltage lower than the maximum voltage applied to the gate of the MOS transistor 11 by $V_T$ (the threshold voltage of the MOS transistor 11) is taken out as the second power supply output voltage $V_{OUT}2$. Since the voltage applied to the gate of the MOS transistor 11 is a voltage from the intermediate node, it fluctuates periodically in synchronism with the clock signals, CLK, $\overline{\text{CLK}}$. Therefore, for instance, if the gate voltage fluctuates between 11 V and 16 V and the threshold voltage $V_T$ of the MOS transistor 11 is 1 V, the second power supply output voltage $V_{OUT}$ 2 has a possibility of varying between 10 V and 15 V. Accordingly, by connecting the diode-connected MOS transistor 13 and the smoothing capacitor 14 between the intermediate node and the MOS transistor 11, the voltage applied to the gate of the step-down MOS transistor 11 can be flattened by the rectifying and smoothing action of the MOS transistor 13 and smoothing capacitor 14. As a result, the second power supply output voltage $V_{OUT}$ 2 is lower than the flattened gate voltage by the portion of threshold voltage $V_T$, and an extremely stabilized voltage is obtained. In this circuit, the second power supply output voltage $V_{OUT}$ 2 is expressed as follows:

$$V_{OUT}2 = n \cdot V_{OUT}1/N + (N+n) \cdot (V_{cc} - V_T)/N + I \cdot Rs - V_T \quad (10)$$

Incidentally, a similar effect will be obtained by using an ordinary diode instead of the diode-connected MOS transistor 13.

In the above embodiments, meanwhile, the gate potential of the step-down MOS transistor 11 is determined by the peak voltage of the intermediate node, or, in other words, the top value of the transient response at the moment of rise (or fall) of clock signals CLK, $\overline{\text{CLK}}$. This top value of transient response suffers extremely by fluctuations of the ON resistances of MOS transistors 2 to 5 and the phase deviations between the two clock signals CLK, $\overline{\text{CLK}}$. Therefore, it is not wise to determine the gate potential of the step-down MOS transistor using the top value.

Figure 5:
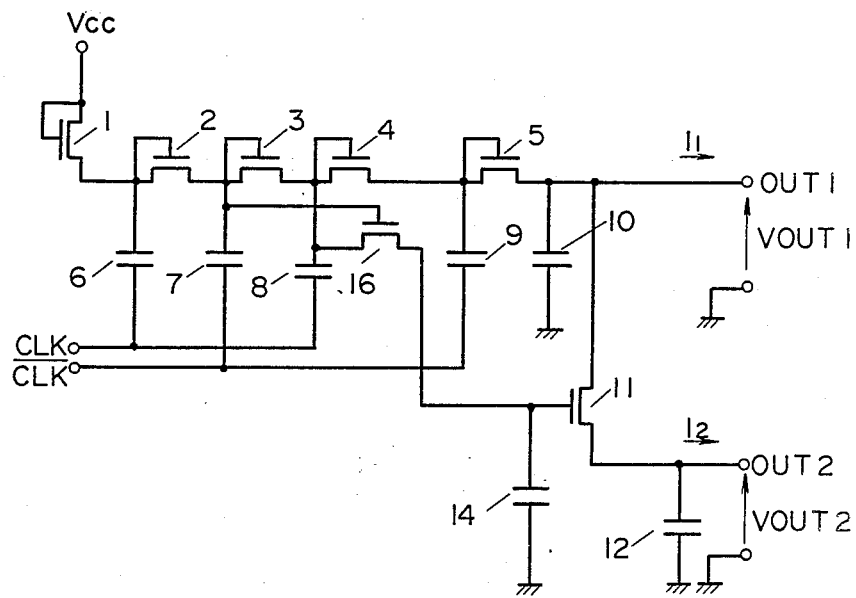
FIG. 5 is a circuit diagram of a fourth embodiment of this invention.

Accordingly, FIG. 5 shows a fourth embodiment of this invention which makes design easier and more precise than the foregoing embodiments. In this embodiment, the intermediate potential is taken out from the intermediate node through a MOS transistor 16 which is gated by the node signal in the previous stage. In this case, in the newly added MOS transistor 16, the gate potential and the charge pump side potential of the source drain are driven in opposite phases, and since the gate side is connected to the node of the previous stage (i.e. to one-stage lower voltage point), the maximum value of the intermediate potential is a low level stationary value (not the top value) of the n-th stage. Therefore, designing becomes easier and more precise. At this time, the second power supply voltage $V_{OUT}2$ is $$V_{OUT}2 = (n-1) \cdot V_{OUT}1/N + (N-n+1) \cdot (V_{cc} - V_T)/N - V_T \quad (11)$$

As clear from equation (11), in this embodiment, the second power supply output voltage $V_{OUT}2$ is determined only by two elements, that is, the first power supply voltage $V_{OUT}1$ and $V_{cc} - V_T$. (In all foregoing embodiments, the element of current I was contained.)

Figure 6:
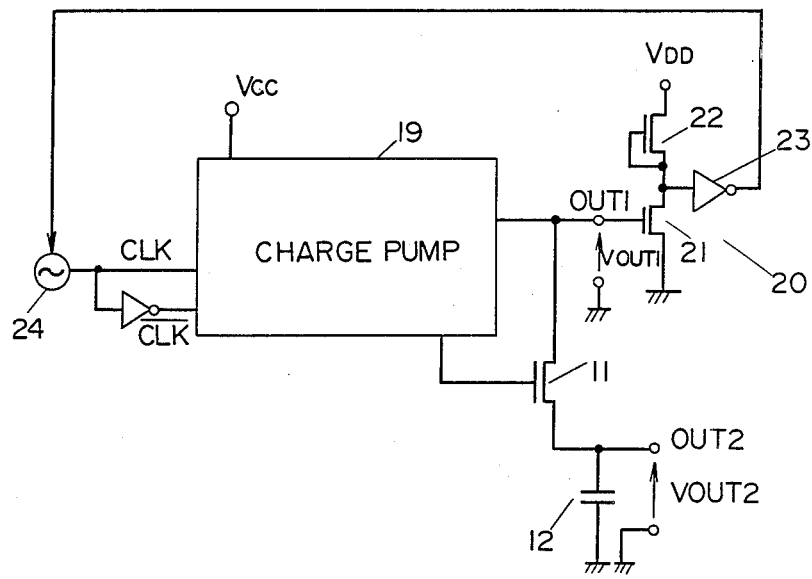
FIG. 6 is a circuit diagram of a fifth embodiment of this invention.

FIG. 6 shows a fifth embodiment, in which the charge pump 19 contains the elements 1 to 10, 13, 14 or 16 shown in FIG. 1, 3, 4 and 5. A voltage detection circuit 20 is composed of a transistor 21 for detection of voltage, a load transistor 22 and an inverter 23. The output of the voltage detection circuit 20 controls the clock signal source 24.

The input power supply voltage $V_{cc}$ is boosted by the charge pump 19, and when the voltage $V_{OUT}1$ of the first power supply output terminal OUT 1 exceeds a predetermined value, the voltage detection transistor 21 is turned on, and the output of the inverter 23 becomes a high level signal. In consequence, the frequency of the clock signal source 24 decreases, and the first power supply output voltage $V_{OUT}1$ is lowered. As a result, when the first power supply output voltage $V_{OUT}1$ becomes lower than the predetermined voltage, the voltage detection transistor 21 is turned off, and the output of the inverter 23 becomes a low level. Hence, the frequency of the clock signal source 24 increases, and the first power supply output voltage $V_{OUT}1$ rises. By repeating such an operation, the first power supply output voltage $V_{OUT}1$ is maintained at a predetermined voltage. When the first power supply output voltage $V_{OUT}1$ is maintained at a predetermined voltage, the second power supply output voltage $V_{OUT}2$ is also maintained at a voltage lower by $V_T$ (threshold voltage of the MOS transistor 11). Therefore, the second power supply current voltage applied to the load can be stabilized.

Particularly, as with the charge pump 19 is FIG. 6, when the charge pump shown in the embodiment in FIG. 5 is used, the second power supply output voltage $V_{OUT}2$ is determined only by the two elements of the first supply output voltage $V_{OUT}1$ and $V_{cc} - V_T$, and the element of current I is not contained, so that the stabilization of the second power supply output voltage $V_{OUT}2$ becomes extremely easy.

In the foregoing embodiments, meanwhile, the unit circuits of the charge pump were composed of diode-connected MOS transistors, but the same effects will be obtained if composed of ordinary diodes.

Thus, by using the integrated high voltage generating system of this invention, since an intermediate potential between the output end potential and input end potential is taken out from the intermediate node of the charge pump, there is no extra current consumption due to the dividing circuit, and the layout area is not to increased due to the dividing circuit, so that excellent effects may be obtained.

We claim:

1. An integrated high voltage generating system comprising:
    a charge pump composed of plural unit circuits, each of said plural unit circuits having a capacitor and a diode element, wherein one end of said capacitor is connected to an input end of said diode element in each of said plural unit circuits, and wherein each of said plural unit circuits represents a stage of said charge pump, and wherein said plural unit circuits are uniformly arranged according to a polarity of each diode element, and wherein an output end of said diode element of each preceding stage is sequentially connected to the input end of said diode element of each succeeding stage, whereby, when clock signals of mutually opposite phases are respectively applied to the other end of each capacitor of adjacent said plural unit circuits, an electric charge stored in said capacitor of each preceding stage is sequentially transferred to said capacitor of each succeeding stage, thereby raising a voltage level on a stage by stage basis;
    a power supply input terminal connected to a first stage of said charge pump at said input end of said diode element of a first unit circuit;
    a first power supply output terminal connected to a final stage of said charge pump at said output end of said diode element of a final unit circuit;
    a second power supply output terminal; and
    a first MOS transistor having source and drain electrodes connected between said first and second power supply output terminals, and having a gate electrode connected at the input end of any one of said plural unit circuits of said charge pump, wherein a voltage of said first power supply output terminal is stepped down according to a voltage applied to said gate electrode, and wherein said stepped down voltage is delivered to said second power supply output terminal.

2. An integrated high voltage generating system according to claim 1, further comprising:
    an additional diode element connected between the input end of any one of said plural unit circuits of said charge pump and said gate electrode of said first MOS transistor.

3. An integrated high voltage generating system according to claim 2, further comprising:
    a smoothing capacitor connected between said gate electrode of said first MOS transistor and a reference potential point.

4. An integrated high voltage generating system according to claim 1, further comprising:
    a second MOS transistor having drain and source electrodes connected between the input end of any one of said plural unit circuits of said charge pump and said gate electrode of said first MOS transistor, and having a gate electrode connected to the input terminal of a unit circuit that is preceeding said any one of said plural unit circuits.

5. An integrated high voltage generating system according to claim 4, further comprising:
    a smoothing capacitor connected between said gate electrode of said first MOS transistor and a reference potential point.

6. An integrated high voltage generating system according to claim 1 further comprising:
    a voltage detection circuit connected to said first power supply output terminal of said charge pump in order to detect if the voltage of said first power supply output terminal has exceeded a predetermined value; and
    means for maintaining the voltage of said first power supply output terminal of the charge pump at said predetermined value.

7. An integrated high voltage generating system according to claim 4, further comprising:
a voltage detection circuit connected to said first power supply output terminal of said charge pump in order to detect if the voltage of said first power supply output terminal has exceeded a predetermined value; and
means for maintaining the voltage of said first power supply output terminal of the charge pump at said predetermined value.

8. Integrated high voltage generating system comprising:
first and second charge pumps individually composed of plural unit circuits, each of said plural unit circuits having a capacitor and a diode element, wherein one end of said capacitor is connected to an input end of said diode element in each of said plural unit circuits, and wherein each of said plural unit circuits represents a stage of each charge pump, and wherein said plural unit circuits are uniformly arranged according to a polarity of said diode elements, and wherein an output end of said diode element of each preceding stage is sequentially connected to the input end of said diode element of each succeeding stage, whereby, when clock signals having mutually opposite phases are respectively applied to the other end of each capacitor of adjacent said plural unit circuits, an electric charge stored in said capacitor of each preceding stage is sequentially transferred to said capacitor of each succeeding stage, thereby raising a voltage level on a stage by stage basis, and wherein said clock signals having mutually opposite phases are respectively supplied to said first and second charge pumps;
a power supply input terminal connected to a first stage of said first and second charge pumps at the input end of said diode element of a first unit circuit;
a first power supply output terminal connected to a final stage of said first and second charge pumps at the output end of said diode element of a final unit circuit;
a second power supply output terminal;
a first MOS transistor having drain and source electrodes respectively connected between said first and second power supply output terminals, and having a gate electrode connected to the input end of any one of the unit circuits of said first charge pump; and
a second MOS transistor having drain and source electrodes respectively connected between said first and second power supply output terminals, and having a gate electrode connected to the input end of any one of the unit circuits of said second charge pump.

9. An integrated high voltage generating system of claim 8, further comprising:
a voltage detection circuit connected to said first power supply output terminal in order to detect if the voltage of said first power supply output terminal has exceeded a predetermined value; and
means for maintaining the voltage of said first power supply output terminal at said predetermined value.

* * * * *